US008984444B2

(12) United States Patent
O (10) Patent No.: US 8,984,444 B2
(45) Date of Patent: Mar. 17, 2015

(54) DISPLAYING RECEIVED MESSAGE WITH ICON

(75) Inventor: Mi Kyung O, Seoul (KR)

(73) Assignee: LG Electronics Inc., Seoul (KR)

( * ) Notice: Subject to any disclaimer, the term of this patent is extended or adjusted under 35 U.S.C. 154(b) by 921 days.

(21) Appl. No.: 12/014,610

(22) Filed: Jan. 15, 2008

(65) Prior Publication Data

US 2008/0201664 A1    Aug. 21, 2008

(30) Foreign Application Priority Data

Feb. 21, 2007  (KR) .................. 10-2007-0017384

(51) Int. Cl.
*G06F 3/0481* (2013.01)
*G06Q 10/10* (2012.01)
*H04M 1/725* (2006.01)

(52) U.S. Cl.
CPC .......... *G06Q 10/107* (2013.01); *G06F 3/04817* (2013.01); *H04M 1/72555* (2013.01); *H04M 1/72552* (2013.01)
USPC ......................................... 715/837; 715/751

(58) Field of Classification Search
CPC ............ G09G 5/377; G09G 2340/145; G09G 2340/14; G06F 3/0481; G06F 2203/04803; G06F 21/36; H04M 1/72552; H04W 4/12; H04W 4/14
USPC .............................. 84/169; 379/374; 455/466; 707/912–922; 709/204–206; 835/837, 835/864, 865; 715/198, 810; 345/326, 339, 345/348, 589, 629
See application file for complete search history.

(56) References Cited

U.S. PATENT DOCUMENTS

| | | | | |
|---|---|---|---|---|
| 5,258,751 A * | 11/1993 | DeLuca et al. | ............... | 340/7.52 |
| 5,347,269 A * | 9/1994 | Vanden Heuvel et al. | ... | 340/7.56 |
| 5,802,466 A * | 9/1998 | Gallant et al. | ................ | 455/413 |
| 5,973,693 A * | 10/1999 | Light | ............................ | 715/835 |
| 6,100,888 A | 8/2000 | Gourdol et al. | | |
| 6,313,736 B1 * | 11/2001 | Hymel et al. | ................ | 340/7.56 |
| 6,333,973 B1 * | 12/2001 | Smith et al. | ................ | 379/88.12 |
| 6,412,021 B1 | 6/2002 | Nguyen et al. | | |
| 6,522,347 B1 * | 2/2003 | Tsuji et al. | .................... | 715/848 |
| 6,570,597 B1 * | 5/2003 | Seki et al. | ..................... | 715/835 |
| 6,597,378 B1 * | 7/2003 | Shiraishi et al. | ............. | 715/764 |
| 6,668,177 B2 * | 12/2003 | Salmimaa et al. | ............ | 455/566 |
| 6,754,885 B1 * | 6/2004 | Dardinski et al. | ............ | 717/113 |
| 6,768,999 B2 * | 7/2004 | Prager et al. | ........................... | 1/1 |
| 6,947,396 B1 * | 9/2005 | Salmi | ............................ | 370/310 |
| 7,231,611 B2 * | 6/2007 | Kumhyr et al. | ............... | 715/837 |
| 2001/0021649 A1 * | 9/2001 | Kinnunen et al. | ............ | 455/412 |
| 2004/0075691 A1 * | 4/2004 | Moon | ............................ | 345/805 |
| 2004/0139396 A1 * | 7/2004 | Gelernter et al. | ............. | 715/515 |

(Continued)

FOREIGN PATENT DOCUMENTS

CN       1449525 A       10/2003
KR   10-2002-0004587 A    1/2002

(Continued)

*Primary Examiner* — Weilun Lo
*Assistant Examiner* — Amy M Levy
(74) *Attorney, Agent, or Firm* — Birch, Stewart, Kolasch & Birch, LLP (57) ABSTRACT

A method for displaying a received message on a terminal. The method includes receiving messages, displaying on a display unit of the terminal different icons according to a type of the received messages, and displaying on the display unit of the terminal information indicating a number of unread received messages among the received messages.

13 Claims, 10 Drawing Sheets

(56) References Cited

U.S. PATENT DOCUMENTS

| | | | |
|---|---|---|---|
| 2004/0255247 A1 | 12/2004 | Demsky et al. | |
| 2005/0050474 A1* | 3/2005 | Bells et al. | 715/747 |
| 2005/0120306 A1 | 6/2005 | Klassen et al. | |
| 2005/0188320 A1* | 8/2005 | Bocking | 715/752 |
| 2006/0085758 A1* | 4/2006 | Backus | 715/772 |
| 2006/0101350 A1* | 5/2006 | Scott | 715/779 |
| 2007/0066283 A1 | 3/2007 | Haar et al. | |
| 2007/0143710 A1* | 6/2007 | Hayman | 715/837 |
| 2007/0156821 A1* | 7/2007 | Hardy et al. | 709/206 |
| 2007/0300183 A1* | 12/2007 | Anttila et al. | 715/808 |
| 2008/0119211 A1* | 5/2008 | Paas et al. | 455/466 |
| 2008/0201649 A1* | 8/2008 | Mattila et al. | 715/763 |

FOREIGN PATENT DOCUMENTS

| | | |
|---|---|---|
| KR | 10-2004-0102622 A | 12/2004 |
| KR | 10-0663582 B1 | 1/2007 |
| WO | 02/01373 A1 | 1/2002 |

* cited by examiner

DISPLAYING RECEIVED MESSAGE WITH ICON

This non-provisional application claims priority under 35 U.S.C. §119(a) to Patent Application No. 10-2007-0017384 filed in Republic of Korea on Feb. 21, 2007, the entire contents of which are hereby incorporated by reference.

BACKGROUND OF THE INVENTION

1. Field of the Invention

This present invention relates to a method and a terminal for displaying a received message with an icon.

2. Description of the Related Art

Mobile terminal now allow users to send and receive multimedia messages (MMS) or short messages (SMS). When a user's mobile terminal receives a message, the mobile terminal displays, for example, a small image in the shape of an envelope to indicate to the user a new message has been received.

However, the mobile terminal displays the small envelope icon regardless of whether the message is an SMS message, MMS message or e-mail message. Therefore, the user can not distinguish what type of message they have received.

SUMMARY OF THE INVENTION

Accordingly, one object of the present invention is to address the above-noted and other objects.

Another object of the present invention is to provide information that assists the user in determining how many and what type of messages they have received on their terminal.

To achieve these and other advantages and in accordance with the purpose of the present invention, as embodied and broadly described herein, the present invention provides in one aspect a method for displaying a received message on a terminal. The method includes receiving messages, displaying on a display unit of the terminal different icons according to a type of the received messages, and displaying on the display unit of the terminal information indicating a number of unread received messages among the received messages. The present invention also provides a corresponding mobile communication terminal.

In another aspect, the present invention provides a method for displaying a received message on a terminal. The method includes receiving multimedia messages, and displaying on a display unit of the terminal different icons according to a type of contents attached to the received multimedia messages. The present invention also provides a corresponding mobile communication terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
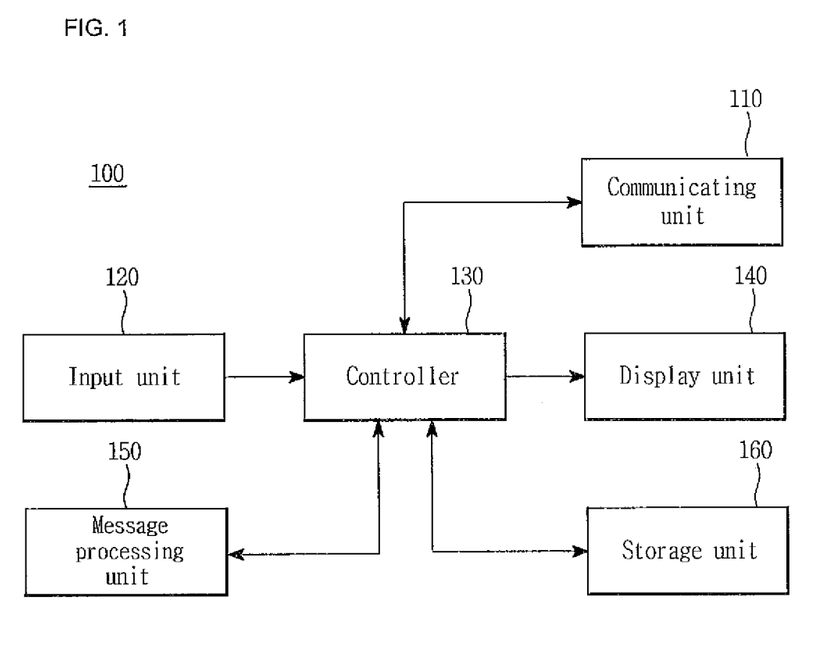
FIG. 1 is a block diagram illustrating a terminal for displaying a received message according to an embodiment of the present invention.

FIG. 1 is a block diagram illustrating a terminal 100 for displaying a received message according to an embodiment of the present invention. As shown, the terminal 100 includes a communicating unit 110, an input unit 120, a controller 130, a display unit 140, a message processing unit 150 and a storage unit 160.

The communicating unit 110 wirelessly receives an SMS message, an MMS message, or an e-mail message from a mobile communication network. Hereinafter, a message including an SMS message, an MMS message, and an e-mail message will also be referred to as a 'multimedia message'.

Further, the input unit 120 is used to select a menu regarding an operation of the terminal 100. In addition, when a multimedia message is received through the communicating unit 110 from the mobile communication network, the controller 130 controls the message processing unit 150 to analyze information about the message and display information (e.g., an icon) regarding a type of the received message and the number of messages that a user has not read yet.

That is, the controller 130 analyzes the received multimedia message and displays an icon indicating a type of corresponding contents attached to the received multimedia message based on a result of the analysis. Further, the display unit 140 displays an operational state or status of the terminal 100 and also displays an icon indicating a type of a received message and the number of messages user has not read yet.

In addition, the display unit 140 includes an indicator area where an RSSI (Received Signal Strength Indication) of an antenna, a remaining battery capacity, and whether a message has been received or not is displayed. Accordingly, the display unit 140 displays various icons indicating the type of the received message and the number of messages which have not been read in the indicator area.

Further, the message processing unit 150 recognizes the type of the message received through the communicating unit 110 based on a message classification field included in a header of the received message. That is, the message processing unit 150 recognizes whether the received message is an SMS message, an MMS message, or an e-mail message, and analyzes whether a single message or multiple messages have not been read by the user.

Next, the message processing unit 150 transfers the analysis information on the received message to the controller 130. In addition, the message processing unit 150 analyzes the multimedia message received through the communicating unit 110, and transfers information on contents attached to the multimedia message to the controller 130.

Thus, the controller 130 displays an icon indicating a type of the corresponding contents attached to the received multimedia message on the display unit 140. Further, the storage unit 160 stores the received message and various types of icons indicating types of received messages and of contents.

Figure 2:
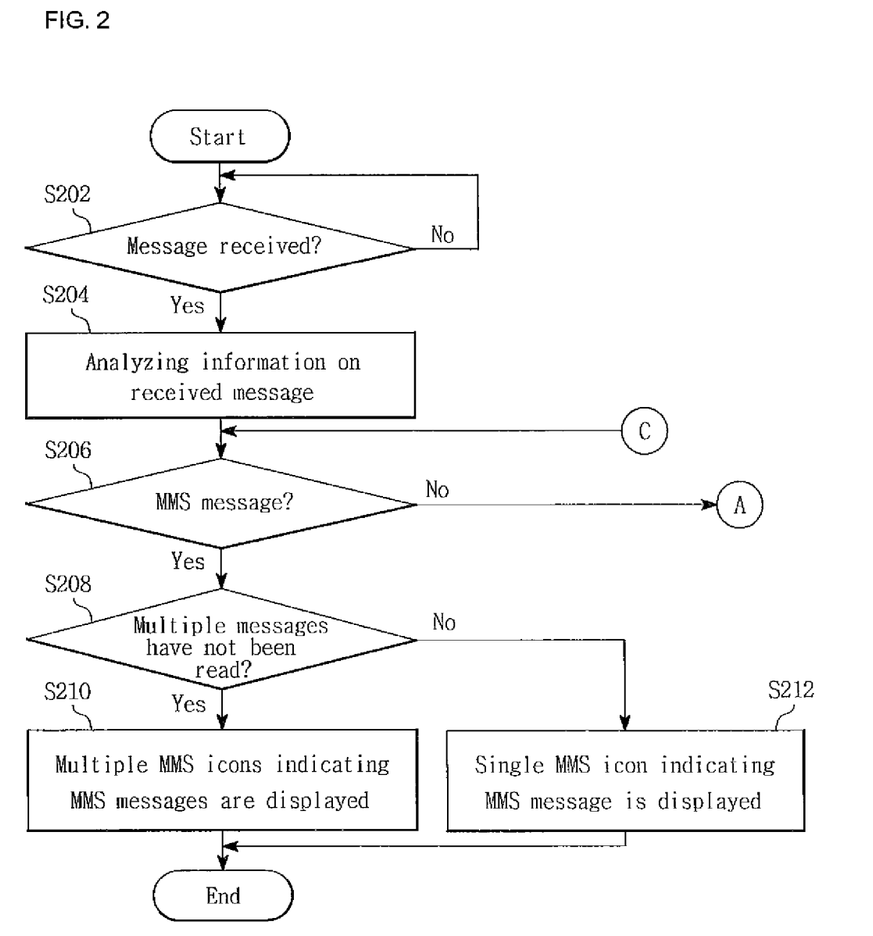
FIG. 2 is a flowchart illustrating a method for displaying a received MMS message according to an embodiment of the present invention.

Next, FIG. 2 is a flowchart illustrating a method for displaying a received MMS message according to an embodiment of the present invention. The overviews shown in FIGS. 5A and 5B will also be referred to in the description of FIG. 2.

As shown in FIG. 2, the terminal 100 receives a message through the communicating unit 110 from the mobile communication network (S202). Then, the controller 130 analyzes the message information through the message processing unit 150 with respect to the received message (S204). As discussed above, the received message includes a header and content of the message, and the header of the message includes a message classification field indicating a type of the message.

Thus, the controller 130 classifies the received message using the message classification field as to whether the received message is an SMS message including text, an MMS message including a music or video file or an e-mail message having an e-mail format. The controller 130 also discriminates whether a single message or multiple messages has/have not been read yet by the user.

Further, as shown in FIG. 2, when the received message is an MMS message (Yes in S206), the controller 130 checks whether multiple MMS messages have not been read by the user (S208). Further, the storage unit 160 stores icons indicating whether the received message is the MMS message, the SMS message, or the e-mail message.

Then, in step S208, the controller 130 determines if multiple MMS messages have not been read by the user according to the analysis results. The controller 130 also reads MMS icons indicating MMS messages from the storage unit 160 and displays the multiple MMS icons as shown in FIG. 5A when there are multiple unread MMS messages (S210).

That is, the controller 130 stores icons indicating multiple MMS messages, multiple SMS messages or multiple e-mail messages in the storage unit 160, and when multiple MMS messages have not been read by the user, the controller 130 reads the MMS icons indicating multiple MMS messages and displays the icons on the display unit 140.

Figure 5A:
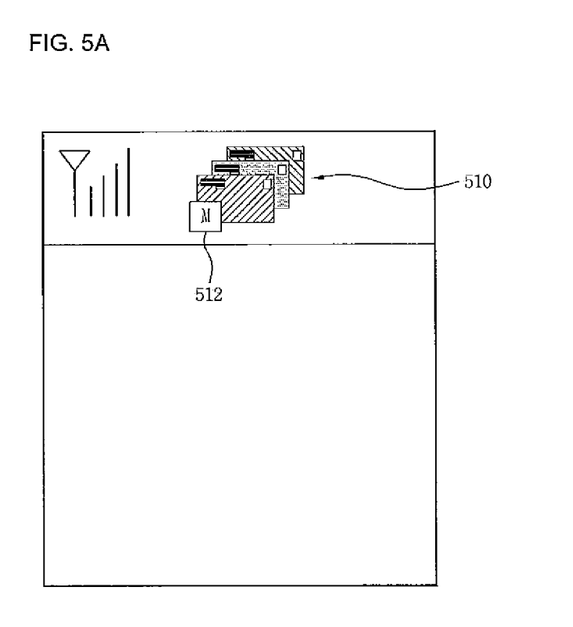
FIG. 5A is an overview illustrating multiple MMS icons indicating that multiple MMS messages have not been read.

For example, FIG. 5A is an overview illustrating multiple MMS icons 510 indicating that multiple MMS messages have not been read. As shown, the multiple MMS icons 510 include a type indicator 512 indicating MMS messages. Further, as shown in FIG. 5A, the controller 130 displays the MMS icons 510 in the indicator area of the display unit 140. The controller can also display the MMS icons 510 in a blinking manner to alert the user there are unread messages.

The controller 130 can also display the MMS icons 510 in a different color to discriminate the MMS icons 510 from other icons. Further, the controller 130 can display the multiple MMS icons 510 next to each title of the messages on a non-read list in an MMS reception box. The controller 130 can also display the MMS icons in an area different than the indicator area.

Figure 5B:
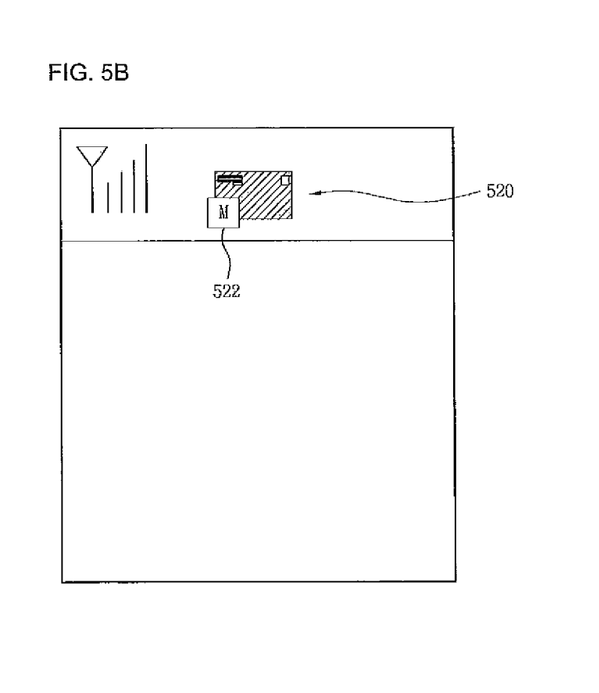
FIG. 5B is an overview illustrating a single MMS icon indicating that a single MMS message has not been read.

Meanwhile, as shown in FIG. 2, when the controller 130 determines a single MMS message has not been read by the user according to the analysis results (No in S208), the controller 130 reads an MMS icon indicating a single MMS message from the storage unit 160 and displays the single MMS icon on the display unit 140 as shown in FIG. 5B (S212).

In more detail, FIG. 5B is an overview illustrating a single MMS icon 520 indicating that a single MMS message has not been read. Similar to FIG. 5A, the single MMS icon 520 in FIG. 5B includes a type indicator 522 indicating the type of message is a MMS message.

Further, the controller 130 can display the single MMS icon 520 in the indicator area of the display unit 140, and display the single MMS icon 520 in a blinking manner. Also, the controller 130 can display the single MMS icon 520 in a different color so as to discriminate the single MMS icon 520 from other icons. The controller 130 can also display the single MMS icon 520 next to each title of messages on a list which have not been read in the MMS reception box.

In addition, when displaying the icon indicating the MMS message, the controller 130 can display an icon indicating whether there is an attachment file to the MMS message and an icon indicating what type of the attachment file is. Further, the controller 130 can display an icon as to whether a single file has been attached to the MMS message or multiple files have been attached to the MMS message.

Next, a description will be given for SMS messages with respect to the flowchart shown in FIG. 3 and the overviews shown in FIGS. 6A and 6B. FIG. 1 will also be referred to in this description. In more detail, FIG. 3 illustrates the processes performed by the controller 130 when the controller 130 determines the message is not an MMS message in step S206 of FIG. 2.

Figure 3:
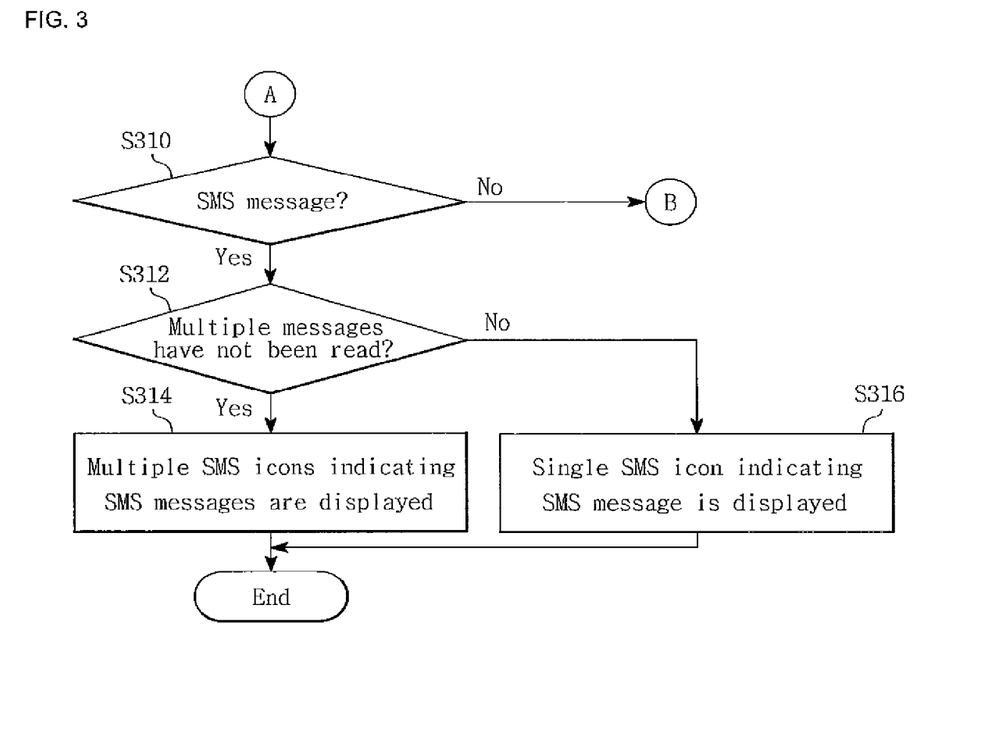
FIG. 3 is a flowchart illustrating a method for displaying a received SMS message according to an embodiment of the present invention.

As shown in FIG. 3, the controller 130 determines if the message is an SMS message (S310). When the controller 130 determines the received message is an SMS message (Yes in S310), the controller 130 checks whether multiple SMS messages have not been read (S312). In addition, when the controller 130 determines multiple SMS messages have not been read (Yes in S312) the controller 130 reads multiple SMS icons indicating SMS messages from the storage unit 160 and displays the multiple SMS icons on the display unit 140 as shown in FIG. 6A (S314).

Figure 6A:
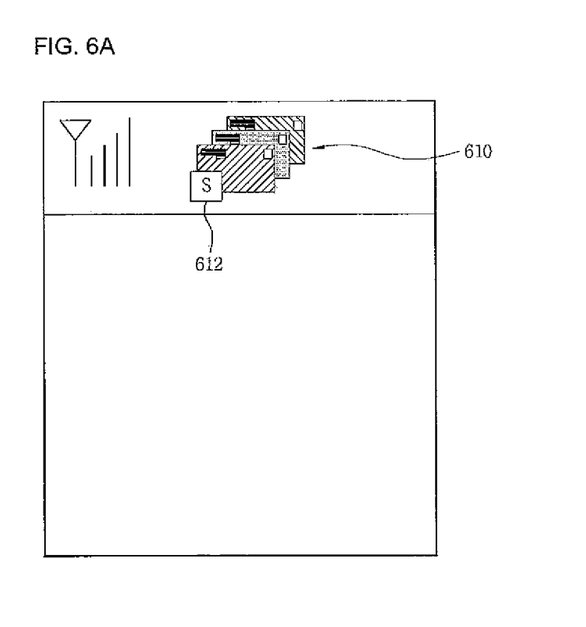
FIG. 6A is an overview illustrating multiple SMS icons indicating that multiple SMS messages have not been read.

In more detail, FIG. 6A is an overview illustrating multiple SMS icons 610 indicating that the multiple SMS messages have not been read. As shown, the multiple SMS icons 610 a type indicator 612 indicating the SMS messages. Further, when the controller 130 determines there are not multiple SMS messages (No in S312). the controller 130 determines a single SMS message has not been read by the user, reads an SMS icon indicating SMS message from the storage unit 160 and displays only the single SMS icon on the display unit 140 as shown in FIG. 6B (S316).

Figure 6B:
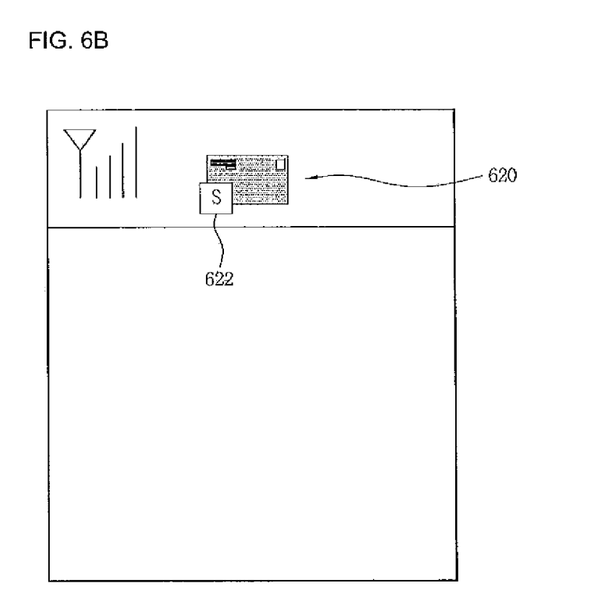
FIG. 6B is an overview illustrating a single SMS icon indicating that a single SMS message has not been read.

In more detail, FIG. 6B is an overview illustrating the single SMS icon 620 indicating that the single SMS message has not been read. As shown, the single SMS icon 620 includes a type indicator 622 indicating the SMS message. As discussed with respect to FIGS. 5A and 5B, the controller 130 displays the single SMS icon 620 and the multiple SMS icon 612 in the indicator area of the display unit 140, and/or in a blinking manner.

The controller 130 can also display the icons 610 and 620 in a different color so as to discriminate the icons from other icons. The controller 130 can also display the icons 610 and 620 next to each title of messages on a list which have not been read in the SMS reception box.

Next, a description will be given for e-mail messages with respect to the flowchart shown in FIG. 4 and the overviews shown in FIGS. 7A and 7B. FIG. 1 will also be referred to in this description. In more detail, FIG. 4 illustrates the processes performed by the controller 130 when the controller 130 determines the message is not an SMS message in step S310 of FIG. 3.

Figure 4:
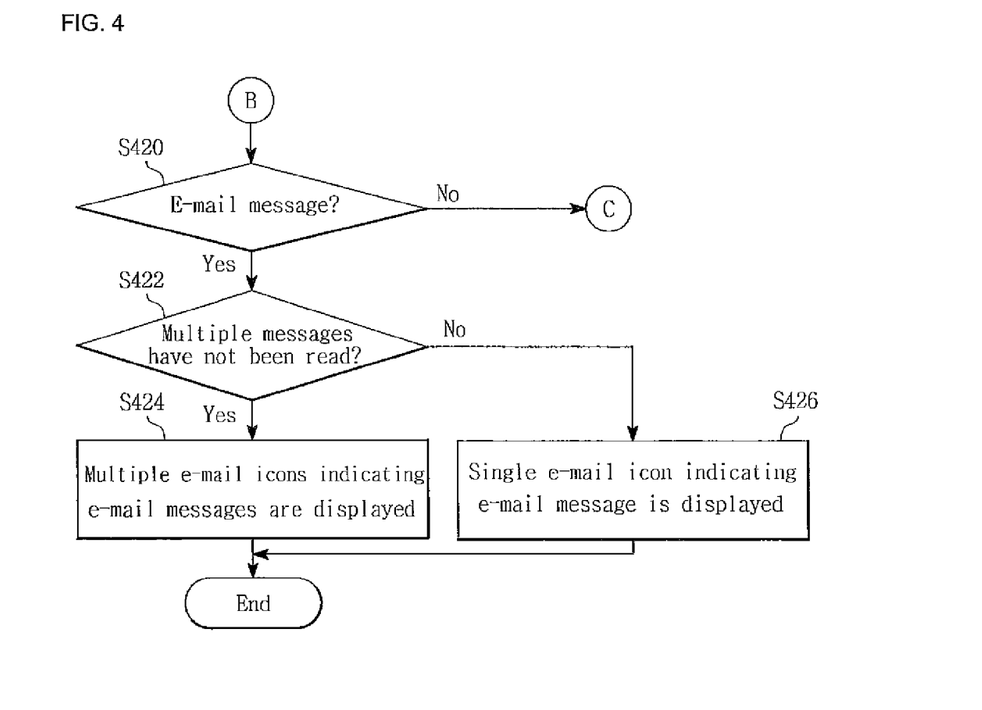
FIG. 4 is a flowchart illustrating a method for displaying a received email message according to an embodiment of the present invention.

As shown in FIG. 4, the controller 130 first determines if the message is an e-mail message (S420). If the controller 130 determines the received message is an e-mail message (Yes in S420), the controller 130 checks whether multiple e-mail messages have not been read (S422).

Figure 7A:
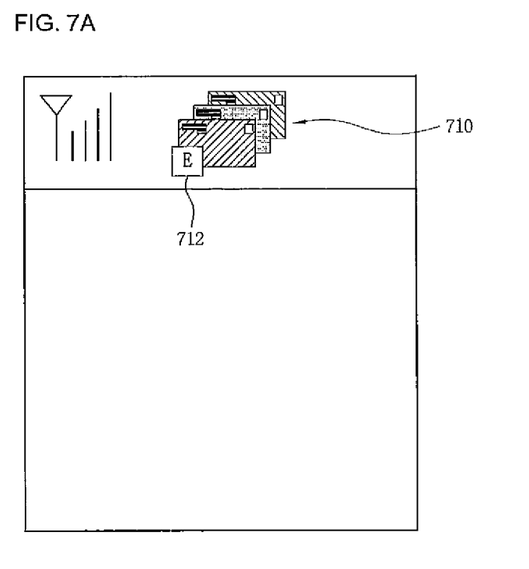
FIG. 7A is an overview illustrating multiple e-mail icons indicating that multiple e-mail messages have not been read.

Similar to the other examples regarding MMS and SMS messages, when the controller 130 determines multiple e-mail messages have not been read by the user (Yes in 422), the controller 130 reads e-mail icons indicating e-mail message from the storage unit 160 and displays multiple e-mail icons on the display unit 140 as shown in FIG. 7A (S424). Further, when the controller 130 determines only a single message has not been read (No in S422), the controller 130 reads an e-mail icon indicating an e-mail message from the storage unit 160 and displays the single e-mail icon on the display unit 140 as shown in FIG. 7B.

Figure 7B:
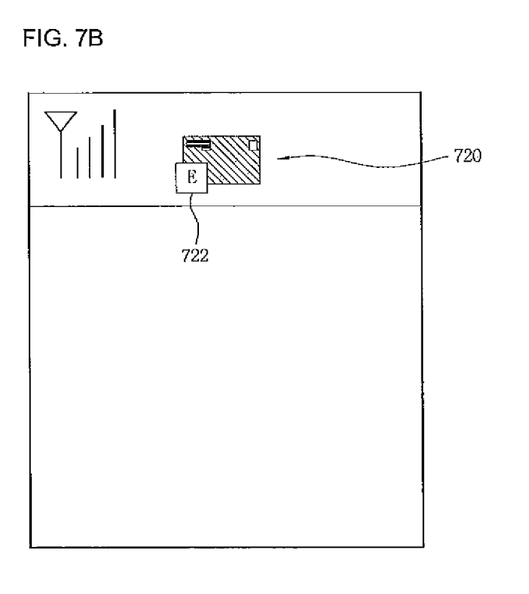
FIG. 7B is an overview illustrating a single e-mail icon indicating that a single e-mail message has not been read.

Further, FIGS. 7A and 7B are similar to FIGS. 5A and 5B and 6A and 6B. That is, FIG. 7A illustrates multiple e-mail icons 710 indicating that the multiple e-mail messages have not been read and a type indicator 712 indicating the e-mail message. FIG. 7B illustrates a single e-mail icon 720 indicating that a single e-mail message has not been read and a type indicator 722 indicating the e-mail message.

Similar to the other examples, the icons can be displayed in a blinking manner, using a different color, or next to each title of messages on a non-read list of an e-mail reception box.

Figure 8:
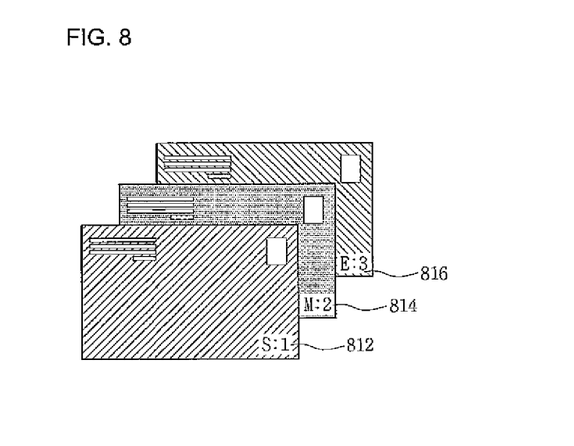
FIG. 8 is an overview illustrating icons when an SMS message, two MMS messages, and three e-mail messages have not been read.

Next, FIG. 8 is an overview illustrating icons when an SMS message, an MMS message and an e-mail message have not been read according to another embodiment of the present invention. In more detail, when the user has not read any of received SMS, MMS and e-mail messages, the controller 130 displays an SMS icon 812 indicating a SMS message, an MMS icon 814 indicating an MMS message, and an e-mail icon 816 indicating an e-mail message on the display unit 140 as shown in FIG. 8.

Namely, the controller 130 reads the SMS icon, the MMS icon and the e-mail icon from the storage unit 160, and displays the icons in an overlap manner as shown in FIG. 8. Alternatively, the controller 130 may also display an integrated icon indicating all of the SMS, MMS and email messages. In this instance, the integrated icon includes the SMS icon 812 indicating the SMS message, the MMS icon 814 indicating the MMS message, and the e-mail icon 816 indicating the e-mail message as a single icon.

Further, the SMS icon 812, the MMS icon 814 and the e-mail icon 816 shown in FIG. 8 each have a different color so that the icons can be discriminated from each other. In addition, when displaying the non-read messages, the controller 130 can display the number of the messages that have not been read together with characters (S, M, E) indicating types of the messages. For example, and as shown in FIG. 8, when a single SMS message has not been read, S:1 can be displayed, when two MMS messages have not been read, M:2 can be displayed, and when three e-mail messages have not been read, E:3 can be displayed.

Further, when the received message is an MMS message, the controller 130 can display an icon indicating whether or not the MMS message includes an attachment file and an icon indicating a type of the attachment file, and can also display an icon indicating whether a single attachment file or multiple attachment files has/have been attached. These features will now be described in more detail with respect to FIGS. 9-12. FIG. 1 will also be referred to in this description.

Figure 10:
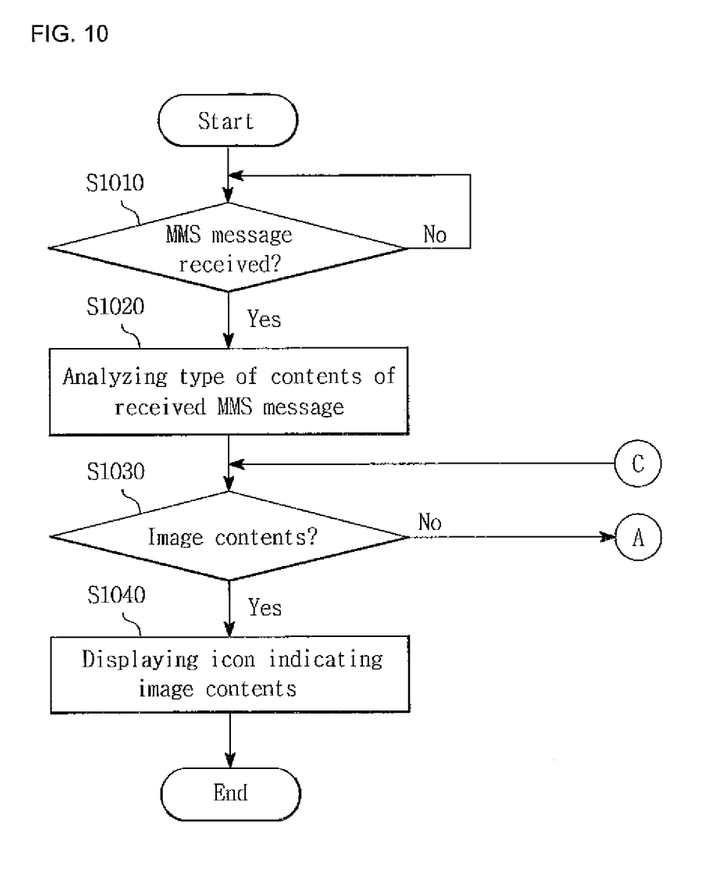
FIG. 10 is a flowchart illustrating a method for displaying a received message including image contents according to an embodiment of the present invention.

As shown in FIG. 10, the controller 130 determines the terminal 100 has received an MMS message through the communicating unit 110 (Yes in S1010). Here, the MMS message refers to a notification message from an MMS server (not shown) that there is an MMS message transmitted to the terminal. That is, when a terminal of the other party creates and sends an MMS message to the terminal 100, the MMS server transmits the notification message with fields defined as shown in the below Table 1 to the terminal 100.

TABLE 1

| Field name | Field value | Description |
| --- | --- | --- |
| X-Mms-Message-Type | Message-type-value=m-send-req | Compulsory, Indicating characteristics of data packet |
| X-Mms-Transaction-ID | Transaction-id-value | Compulsory, A unique key value indicating packet |
| X-Mms-MMS-Version | MMS-version-value | Compulsory, Indicating MMS version |
| Date | Date-value | Optional, Indicating date |
| From | From-value | Compulsory, Address of person who created message |
| To | To-value | Optional, Naming receiver. |
| Cc | Cc-value | Optional item |
| Bcc | Bcc-value | Optional item |
| Subject | Subject-value | Optional, Inputting title of MM |
| X-Mms-Message-Class | Message-class-value | Optional, Classifying message |
| X-Mms-Expiry | Expiry-value | Optional, Amount |

TABLE 1-continued

| Field name | Field value | Description |
| --- | --- | --- |
| X-Mms-Priority | Priority-value | stored in MMSC Optional, Importance level of message |
| X-Mms-Sender-Visibility | Sender-visibility-value | Optional, Sender is not to be seen |
| X-Mms-Delivery-Report | Delivery-report-value | Optional, Choose to be reported |
| X-Mms-Read-Reply | Read-reply-value | Optional, Receiving report on whether it was read |
| X-Mms-Reply-Charging | Reply-charging-value | Optional, Used when sender charges reply fee |
| X-Mms-Reply-Charging-Deadline | Reply-charging-deadline-value | Optional, Charging reply fee within certain time in case of charging reply fee |
| X-Mms-Reply-Charging-Size | Reply-charging-size-value | Optional, Charging only particular size in case of charging reply fee |
| X-Mms-Reply-Charging-ID | Reply-charging-ID-value | Optional, ID of original MM as returned in case of charging reply fee |
| Content-Type | Content-type-value | Compulsory, Type of contents of MM |

Thus, as shown in FIG. 10, when the MMS message is received (Yes in S101), the controller 130 analyzes a type of contents of the received MMS message through the message processing unit 150 (S1020). Namely, the controller 130 analyzes whether the MMS message includes only text or whether the MMS message includes image (picture) contents, audio contents, or video contents through a contents type field included in the notification message. Here, the image contents correspond to a photo image captured by a digital camera or a picture or an image created using a graphic tool.

Figure 9A:
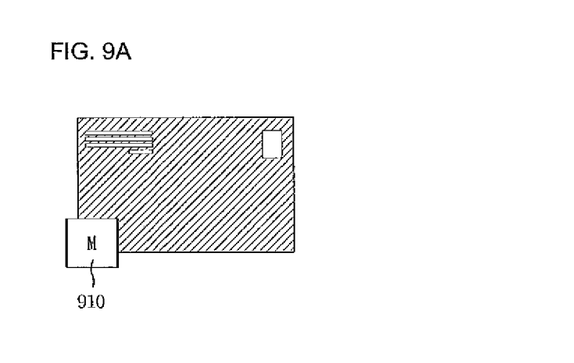
FIG. 9A is an overview illustrating an icon indicating a basic MMS message.

Further, the MMS message may only include text data, and not image (picture) contents, audio contents, or video contents according to the analysis results. Thus, if the received MMS message does not contain any contents besides text, the controller 130 can display a character or an icon indicating that there are not any contents. Namely, as shown in FIG. 9A, the controller 130 displays an icon indicating the basic MMS message on the display unit 140. As shown in FIG. 9A, the displayed icon includes a type indicator 910 indicating the type of the received message.

Figure 9B:
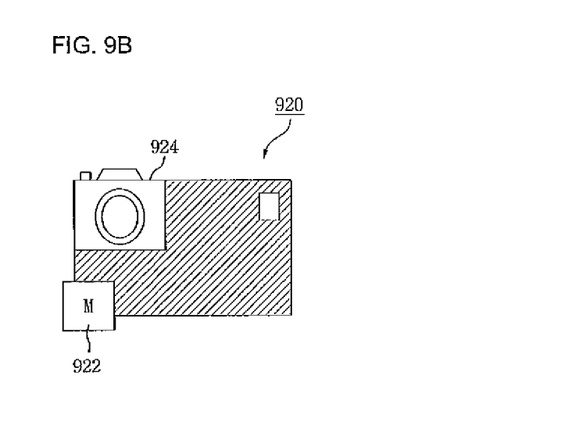
FIG. 9B is an overview illustrating an icon indicating image contents.

In addition, as shown in FIG. 10, when the controller 130 determines the received MMS message includes image (picture) contents according to the analysis results (Yes in S1030), the controller 130 reads an image contents icon indicating image (picture) contents among contents icons stored in the storage unit 160 and displays the icon on the display unit 140 as shown in FIG. 9B (S1040).

As shown in FIG. 9B, the displayed icon is an image contents icon 920 including a type indicator 922 indicating the MMS message and a contents indicator 924 indicating image contents are included in the MMS message. As shown, the contents indicator 924 is expressed in the shape of a camera, but the contents indicator 924 can be expressed in a different shape. The controller 130 can also display only a character indicating that the image contents are included in the received MMS message.

Figure 11:
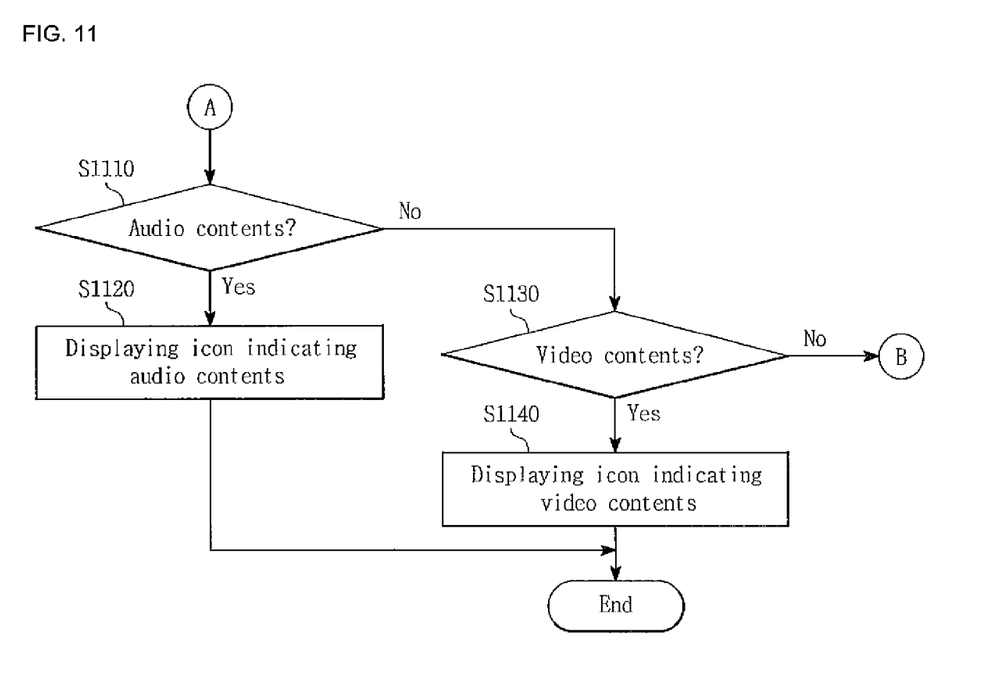
FIG. 11 is a flowchart illustrating a method for displaying a received message including image or audio contents according to an embodiment of the present invention.

Next, when the controller 130 determines the message does not include image contents (No in S1030), the controller 130 determines if audio contents are included (S1110 in FIG. 11). When the controller 130 determines the contents included in the received MMS message are audio contents (or sound contents) (Yes in S1110), the controller 130 reads an icon indicating audio contents among contents images stored in the storage unit 160 and displays the icon on the display unit 140 as shown in FIG. 9C (S1120).

Figure 9C:
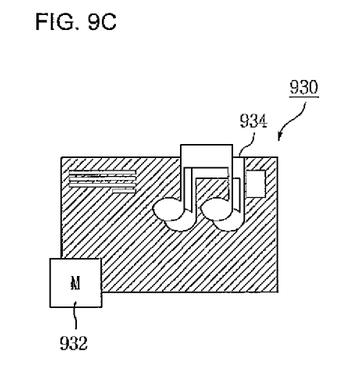
FIG. 9C is an overview illustrating an icon indicating audio contents.

As shown in FIG. 9C, the displayed icon is an audio contents icon 930 including a type indicator 932 indicating the MMS message and a contents indicator 934 indicating audio contents are included in the MMS message. As shown, the contents indicator 934 is expressed in the shape of musical notes, but the icon can be expressed in a different shape. The controller 130 can also only display a character indicating audio contents are included in the MMS message.

Next, as shown in FIG. 11, when the controller 130 determines the message does not include audio contents (No in S1110), the controller 130 determines if the message includes video contents (S1130). When the controller 130 determines the contents included in the received MMS message are video contents (Yes in S1130), the controller 130 reads an icon indicating video contents among the contents images stored in the storage unit 160 and displays the on the display unit 140 as shown in FIG. 9D (S1140).

Figure 9D:
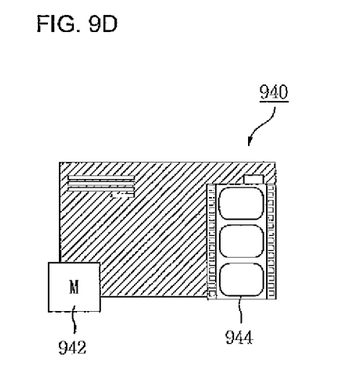
FIG. 9D is an overview illustrating an icon indicating video contents.

As shown in FIG. 9D, the icon is a video contents icon 940 including a type indicator 942 indicating the MMS message and a contents indicator 944 indicating that the video contents are contained in the MMS message. As shown, the contents indicator 944 has the shape of a film, but the indicator 944 can be also expressed in a different shape. Further, the controller can also only display a character indicating that the video contents are contained in the MMS message.

Figure 9E:
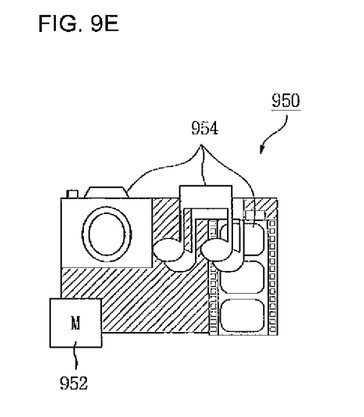
FIG. 9E is an overview illustrating an icon indicating combined contents.
Figure 12:
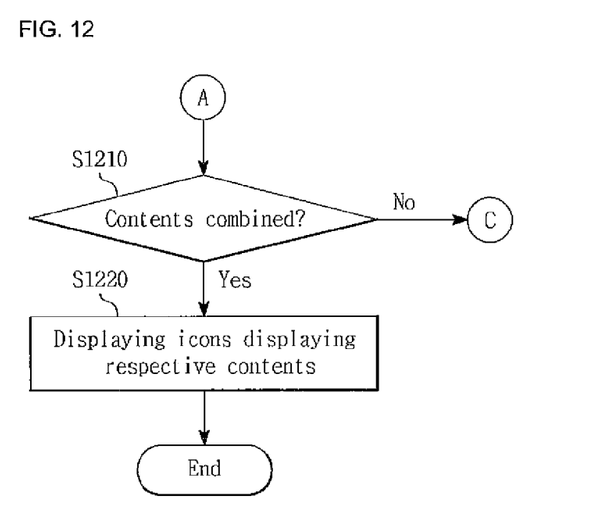
FIG. 12 is a flowchart illustrating a method for displaying a received message including combined contents according to an embodiment of the present invention.

Further, the flowchart in FIG. 12 illustrates when the controller 130 determines there are no image contents in step S1030 of FIG. 10. As shown in FIG. 12, the controller 130 determines if the contents contained in the received MMS message are combined contents including an image, audio, and video (S1210). When the controller 130 determines the contents are combined contents (Yes in S1210), the controller 130 reads an image contents icon, an audio contents icon, and a video contents icon from the storage unit 160 and displays the icons on the display unit 140 as shown in FIG. 9E. The controller 130 can also read a combined contents icon indicating all of the image contents, the audio contents, and the video contents from the storage unit 160 display the combined icon on the display unit 140.

As shown in FIG. 9E, the combined contents icon 950 includes a type indicator 952 indicating the MMS message and contents indicators 954 indicating that the respective contents are contained in the MMS message. Further, the contents indicators 954 may be expressed by mixing the shapes of the camera, the musical note, and the film.

Similar to the other icons discussed above, the controller 130 can display the combined contents icon 950 in the indicator area of the display unit 140, display the combined contents icon 950 in a blinking manner, and/or display the contents indicators 954 of the combined contents icon 950 in different colors to discriminate the icon from other icons or contents. The controller 130 can also display the combined contents icon 950 next to each title of messages on the list of the MMS reception box. Further, the controller 130 can display only a character indicating that the MMS message contains the image contents, the audio contents, and the video contents.

Accordingly, when the user receives a multimedia message on their terminal, he/she can easily recognize what type of message has been received, how many messages have been received, and also can easily recognize what type of contents are contained in the received multimedia message.

In addition, according to embodiments of the present invention, when a message is received by the terminal, the received message is analyzed and information (e.g., one or more icons) is displayed to inform the user about the received message(s). Thus, the user can easily recognize what type of message has been received and/or how many messages have been received.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for displaying a received message on a terminal, the method comprising:
   storing, in a memory of the terminal, a library of icons including message icons having different shapes for representing different types of messages, contents icons having different shapes for representing different types of a plurality of contents of files attached to the message, and number icons for indicating numbers of the files,
   wherein the message icons include an e-mail icon, a short message icon, a multimedia message icon, and an integrated message icon,
   wherein the integrated message icon indicates all of the e-mail icon, the short message icon and the multimedia message icon in an overlapping manner as a single icon,
   wherein the contents icons include an audio contents icon, an image contents icon, a video contents icon, and a combined contents icon, and
   wherein the combined contents icon indicates all of the audio content icon, the image contents icon and the video contents icon in an overlapping manner as a single icon;
   receiving, via a wireless communication unit, at least one message;
   determining, via a controller of the terminal, a type of each of the received at least one message, and a number of the at least one file attached to a multimedia message and a type of contents of each of at least one file attached to the multimedia message when the type of each of the received at least one message is the multimedia message including the at least one file;
   searching the library of icons for at least one message icon, a number icon and at least one contents icon, based on the type of each of the received at least one message, the number of the at least one file attached to the multimedia message, and the type of contents of each of the at least one file;
   displaying, on an indicator area of a display unit of the terminal, the searched at least one message icon corresponding to the type of each of the received at least one message and when the received at least one message is the multimedia message, further displaying the searched number icon and the searched at least one contents icon in an overlapping manner and the combined contents icon is displayed instead of each of the audio contents icon, the image contents icon and the video contents icon when the received multimedia message includes all of an audio file, image file, and video file,
   wherein the displaying step displays two or more different shapes of message icons in an overlapping manner when the received at least one message includes two or more different types of messages and displays the integrated message icon when the received at least one message includes all of an e-mail, a short message, and a multimedia message.

2. The method of claim 1, wherein the searched at least one message icon includes a character corresponding to the type of each of the received at least one message.

3. The method of claim 1, wherein each of the contents icons has a color for representing the different types of the plurality of contents.

4. The method of claim 1, wherein the searched at least one message icon is displayed in a blinking manner according to the different types of messages.

5. The method of claim 1, wherein the displayed contents icons corresponding to the different types of the plurality of contents of files attached to the multimedia message comprise at least one particular indicator, the shape of the at least one particular indicator corresponding to the different types of the plurality of contents of files attached to the multimedia message such that a user can determine the type of the plurality of contents by viewing the displayed contents icons.

6. The method of claim 5, wherein the shape of the at least one particular indicator comprises a camera shape or camera image, a musical note shape or musical note image, or a video shape or video image.

7. The method of claim 1, wherein the displayed message icon disappears from the display unit when there are no unread messages for the corresponding displayed message icon.

8. The method of claim 1, wherein the displaying step further displays the icons in the combined contents icon overlapping each other to indicate the different types of the plurality of contents of files attached to the multimedia message, respectively.

9. A mobile communication terminal, comprising:
   a memory configured to store a library of icons including message icons having different shapes for representing different types of messages, contents icons having different shapes for representing different types of a plurality of contents of files attached to the message, and number icons for indicating numbers of the files,
   wherein the message icons include an e-mail icon, a short message icon, a multimedia message icon, and an integrated message icon,
   wherein the integrated message icon indicates all of the e-mail icon, the short message icon and the multimedia message icon in an overlapping manner as a single icon,
   wherein the contents icons include an audio contents icon, an image contents icon, a video contents icon, and a combined contents icon and
   wherein the combined contents icon indicates all of the audio content icon, the image
   contents icon and the video contents icon in an overlapping manner as a single icon; a wireless communication unit configured to receive at least one message;
   a controller configured to:
   determine a type of each of the received at least one message, and a number of the at least one file attached to a multimedia message and a type of contents of each of at least one file attached to the multimedia message when the type of each of the received at least one message is the multimedia message including the at least one file, and search the library of icons for at least one message icon, a number icon and at least one contents icon, based on the type of each of the received at least one message, the number of the at least one file attached to the multimedia message, and the type of contents of each of the at least one file; and a display unit configured to:

display, on an indicator area of a display unit of the terminal, the searched at least one message icon corresponding to the type of each of the received at least one message and when the received at least one message is the multimedia message, further displaying the searched number icon and the searched at least one contents icon in an overlapping manner and the combined contents icon is displayed instead of each of the audio contents icon, the image contents icon and the video contents icon when the received multimedia message includes all of an audio file, image file, and video file, wherein the display step displays two or more different shapes of message icons in an overlapping manner when the received at least one message includes two or more different types of messages and displays the integrated message icon when the received at least one message includes all of an e-mail, a short message, and a multimedia message.

10. The mobile communication terminal of claim 9, wherein each of the message icons includes a character corresponding to the type of the at least one message.

11. The mobile communication terminal of claim 9, wherein the displayed contents icons corresponding to the different types of the plurality of contents of files attached to the multimedia message comprise at least one particular indicator, wherein the at least one particular indicator has a color for representing the different types of the plurality of contents, and wherein the controller is further configured to display the message icons in a blinking manner according to the different types of messages.

12. The mobile communication terminal of claim 9, wherein the shape of the at least one particular indicator comprises a camera shape or camera image, a musical note shape or musical note image, or a video shape or video image.

13. The mobile communication terminal of claim 9, wherein the display unit displays the icons in the combined contents icon overlapping each other to indicate the different types of the plurality of contents of files attached to the multimedia message, respectively.

* * * * *